United States Patent
Harvey

(10) Patent No.: US 11,618,524 B2
(45) Date of Patent: Apr. 4, 2023

(54) BICYCLE BEARING SYSTEM

(71) Applicant: Matt Harvey, Oakland, CA (US)

(72) Inventor: Matt Harvey, Oakland, CA (US)

( * ) Notice: Subject to any disclaimer, the term of this patent is extended or adjusted under 35 U.S.C. 154(b) by 0 days.

(21) Appl. No.: 17/407,365

(22) Filed: Aug. 20, 2021

(65) Prior Publication Data

US 2023/0056140 A1    Feb. 23, 2023

(51) Int. Cl.
*B62K 21/06* (2006.01)
*B62M 3/00* (2006.01)
*F16C 19/14* (2006.01)
*F16C 33/78* (2006.01)
*F16C 33/38* (2006.01)

(52) U.S. Cl.
CPC ............. *B62K 21/06* (2013.01); *F16C 19/14* (2013.01); *F16C 33/38* (2013.01); *F16C 33/78* (2013.01); *B62M 3/00* (2013.01); *F16C 2326/20* (2013.01); *F16C 2326/26* (2013.01); *F16C 2326/28* (2013.01)

(58) Field of Classification Search
CPC .... F16C 19/14; F16C 19/548; F16C 33/7816; F16C 33/784; F16C 33/7843; F16C 33/7853; F16C 33/7856; F16C 2326/20; F16C 2326/26; F16C 2326/28; F16C 19/16; F16C 33/38; F16C 33/78; F16C 33/7806; B62K 21/06; B62M 3/003
See application file for complete search history.

(56) References Cited

U.S. PATENT DOCUMENTS

| | | | | |
|---|---|---|---|---|
| 466,443 A | * | 1/1892 | Simonds | F16C 33/425 |
| | | | | 384/524 |
| 572,003 A | | 11/1896 | Green | |
| 3,578,829 A | * | 5/1971 | Hata | F16C 25/083 |
| | | | | 74/594.1 |
| 5,634,727 A | * | 6/1997 | Lin | F16C 35/06 |
| | | | | 74/594.2 |
| 5,690,432 A | * | 11/1997 | Lin | F16C 35/077 |
| | | | | 384/545 |
| 5,899,539 A | | 5/1999 | Lin | |
| 5,980,116 A | * | 11/1999 | Chiang | F16C 35/073 |
| | | | | 384/538 |
| 6,003,889 A | | 12/1999 | Shalom | |
| 2001/0040353 A1 | * | 11/2001 | Campagnolo | B62K 21/06 |
| | | | | 280/279 |
| 2007/0170690 A1 | | 7/2007 | Hermansen | |

FOREIGN PATENT DOCUMENTS

EP       0541070 A1 *  5/1993

* cited by examiner

*Primary Examiner* — Phillip A Johnson
(74) *Attorney, Agent, or Firm* — Michael A. Blake

(57) ABSTRACT

A bicycle bearing system comprising: an integrated cup, the integrated cup having a non-flanged outer diameter; a plurality of rolling elements configured to abut and rotate against an inner surface of the cup race; an inner race configured to abut and rotate about the plurality of rolling elements, the inner race having an inner diameter; wherein the rolling elements do not have a separate outer race, but rather the inner surface of the integrated cup acts as the outer race to the rolling elements; wherein the rolling elements' sizes are maximized to the limitation that the non-flanged outer diameter is smaller or equal to a first maximum diameter, and wherein the rolling elements sizes are maximized to the limitation that the inner diameter is greater or equal to a first minimum diameter.

13 Claims, 14 Drawing Sheets

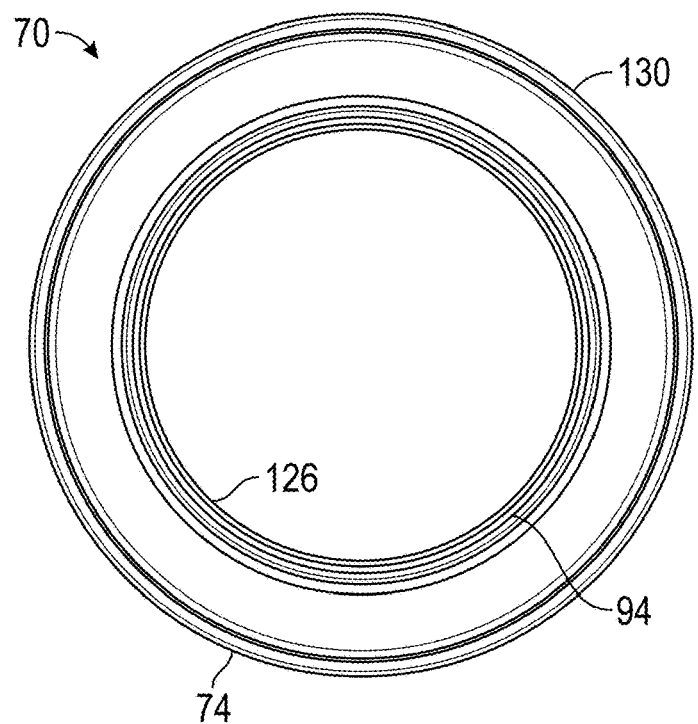
FIG. 13
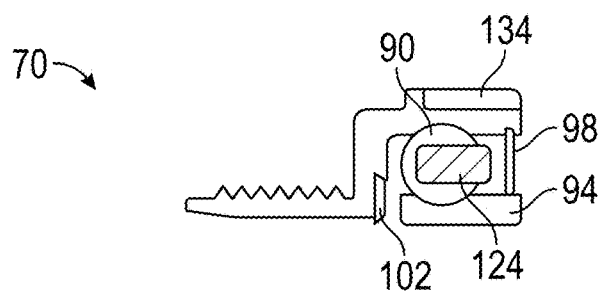
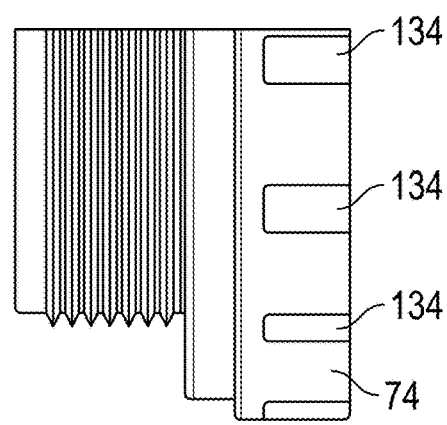
FIG. 14

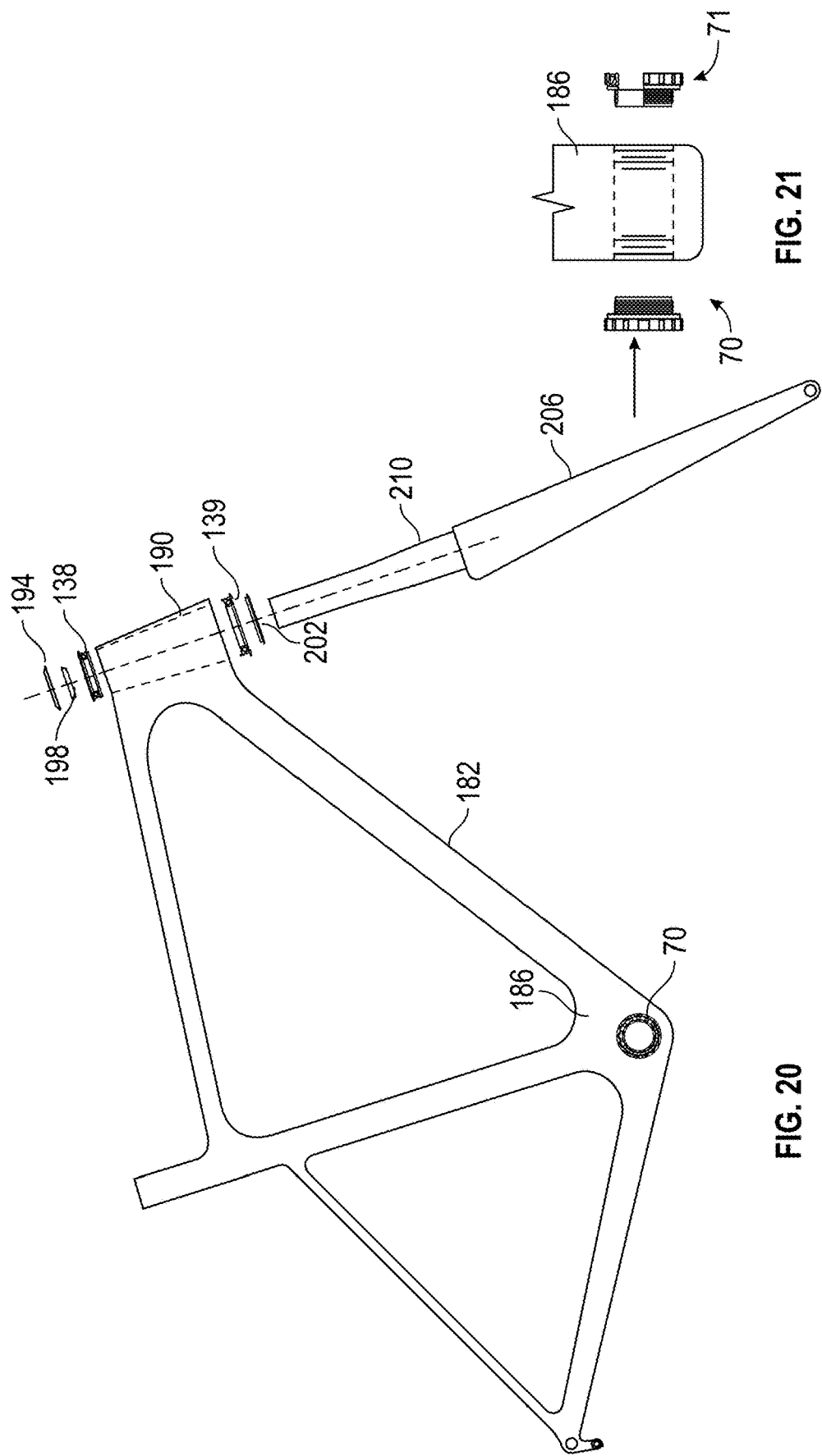

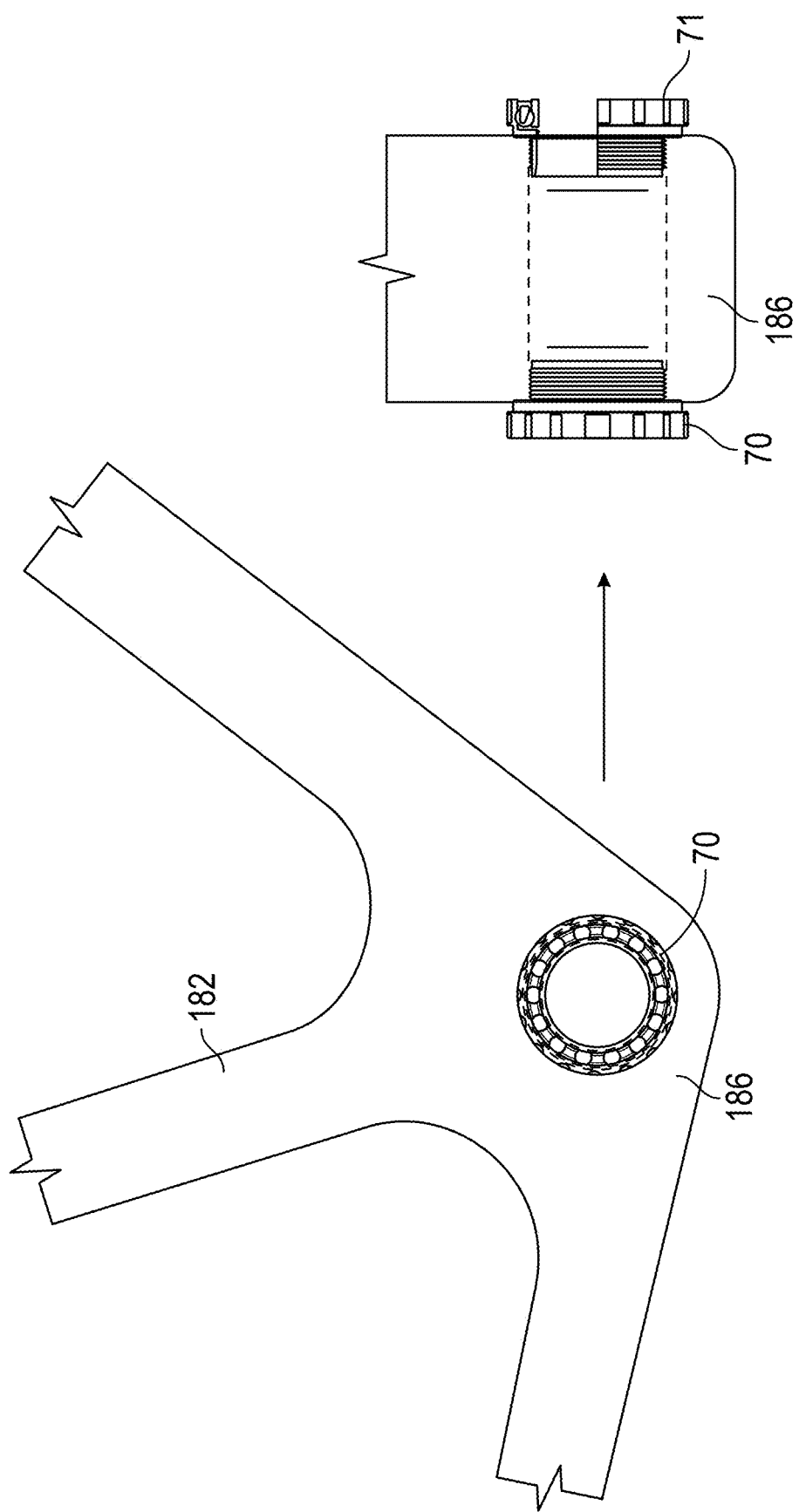

BICYCLE BEARING SYSTEM

TECHNICAL FIELD

The present invention relates generally to bearing systems, and more particularly, to a bearing system for bicycles.

BACKGROUND

There are many bottom bracket standards currently being used for bicycles, almost all of them utilize aluminum "cups," that are either threaded or pressed into the bottom bracket shell, and have a steel cartridge bearing unit pressed into the bore of the cup. Because of the limiting parameter dimensions of the tool needed to install the threaded cup, or the inside diameter of the bottom bracket shell, in the case of the press-fit standards, and the diameter of the crank spindle, the size of the ball bearing used in these applications is generally very small and tends to wear out relatively quickly. In addition, pressing the cartridge bearing into the cup can be a challenging problem in production due to inconsistencies with maintaining proper tolerances to ensure ideal bearing performance like anodization or temperature controls while machining leading to some cartridge bearings being too loose in the cup, or worse too tight and the bearings wearing out prematurely. Some manufacturers have resorted to gluing the cartridge bearings in; however, glue can leak into the bearing seals creating problems.

FIG. 1 is a partial cross-sectional side view of a prior art example of a press-fit bottom bracket bearing system 10. The bearing system 10 comprises a first cup 14, a second cup 18, and a spacer 22. In this example a first bearing 26 is press fit into the cup 14, and a second bearing 30 is press fit into the cup 18. Both bearings 26, 30 comprise a rolling element 34, outer race 38, and inner race 42. FIG. 2 is a cross-sectional front view of the first cup 14 and first bearing 26. The diameter through the bottom bracket shell is fixed, thus the maximum cup diameter is generally fixed. Since the bearings 26 have both an inner race, outer race, and rolling elements that must fit within the cup, and also must have an opening diameter to allow the spindle crank to operate, the space available for the cup, and bearing is limited. Therefore the rolling element must be small enough to fit between the inner and outer races. But unfortunately smaller rolling elements have less load bearing capability than larger rolling elements, and will generally have a shorter life span than larger rolling elements. Current bottom bracket bearings have bearing sizes of about 3 mm (about ⅛ inch) in diameter to about 4 mm (about 5/32 inch) in diameter. FIG. 3 is a partial cross-sectional side view of a prior art example of a press-fit bottom bracket bearing system 410. The bearing system 410 comprises a first cup 414, a second cup 418. In this example a first bearing 426 is press fit into the cup 414, and a second bearing 430 is press fit into the cup 418. Both bearings 426, 430 comprise a rolling element 434, outer race 438, and inner race 442. The outer surfaces of the cups 414, 418 have threads 446 configured to mate with threads on the inner surface of the bottom bracket shell. FIG. 4 is a cross-sectional front view of the first cup 414 and first bearing 426.

Like bottom brackets, there are also a number of headset standards currently being used for bicycles, one standard is a headset bearing assembly that is comprised of two separate flanged aluminum bearing "cups" which accept a "drop in" cartridge bearing or a type of cartridge bearing that is not press fit into the bearing bore, that are then pressed into the top and bottom of the headtube of the bicycle. Because these cartridge bearings simply float in the cup assembly, they can sometimes move within the cup in some cases creating early bearing failure under high load. Especially if the cup bore has been made too large in production or inaccurately, the cartridge bearing cannot seat properly and align. Because there are two parts; the outer bearing cup and the cartridge bearing assembly inside, the ball size must be quite small, usually ⅛" is the industry standard. For mountain bikes with long travel forks, this ball size is too small and the cartridge bearings can wear out or be damaged by the extra-large forces from the extreme riding. The longer fork combined with the slacker head-angles found in these bikes acts as a lever on this cartridge bearing and the small balls become inadequate to carry the load. Current headset bearings may have ball sizes of about 3 mm or ⅛ inch in diameter.

FIG. 5 is a cross-sectional side view of a prior art example of a headset flanged bearing system 46. In this view, a cup 50 shown with a cartridge bearing 54 dropped or pressed into the cup 50. The cartridge bearing comprises an outer race 58, inner race 62, and rolling elements 66. The races 58, 62 have a shape to allow the bearings to provide both radial and axial load bearing. FIG. 6 is a top view of the bearing system 46 from FIG. 3. For the purposes of this drawing the seals have been removed so that the rolling elements 66 are visible. The diameter through the head tube is fixed, thus the maximum cup diameter is generally fixed. Since the bearing 54 has an outer race, inner race, and rolling elements that must fit within the cup, and also must have an opening diameter for the fork steerer tube to rotate, the space available for the cup, and bearing is limited. Therefore the rolling element must be small enough to fit between the outer and inner races, but smaller rolling elements have less load bearing capability then larger rolling elements, and will generally have a shorter life span than larger rolling elements.

Thus there is a need for a bicycle bearing system that overcomes the above listed and other disadvantages.

SUMMARY OF THE INVENTION

The disclosed invention relates to a bicycle bearing system comprising: an integrated cup, the integrated cup having a non-flanged outer diameter; a plurality of rolling elements configured to abut and rotate against an inner surface of the cup race; an inner race configured to abut and rotate about the plurality of rolling elements, the inner race having an inner diameter; wherein the rolling elements do not have a separate outer race, but rather the inner surface of the integrated cup acts as the outer race to the rolling elements; wherein the rolling elements' sizes are maximized to the limitation that the non-flanged outer diameter is smaller or equal to a first maximum diameter, and wherein the rolling elements sizes are maximized to the limitation that the inner diameter is greater or equal to a first minimum diameter.

BRIEF DESCRIPTION OF THE DRAWINGS

The present disclosure will be better understood by those skilled in the pertinent art by referencing the accompanying drawings, where like elements are numbered alike in the several figures, in which:

FIG. 13 is a rear view of the bearing system cup from FIG. 9;

FIG. 14 shows a partial cross-sectional view of the bearing system from FIG. 9;

FIG. 20 shows a side view of a bicycle frame with a bottom bracket bearing system installed in a bottom bracket and an exploded assembly view of the top headset bearing system and bottom headset bearing system shown with respect to the head tube;

FIG. 21 is a front cross-sectional assembly view of the bottom bracket showing a first side view of the first bottom bracket thread-in bearing system with a second thread-in bottom bracket bearing system in a partial cross-sectional view;

FIG. 22 is a close-up view of the bottom bracket with the first bottom bracket thread-in bearing system installed;

FIG. 23 is a front cross-sectional view of the bottom bracket showing a first side view of the first bottom bracket thread-in bearing system with a second bottom bracket bearing system in a partial cross-sectional view;

DETAILED DESCRIPTION OF THE INVENTION

Figure 1:
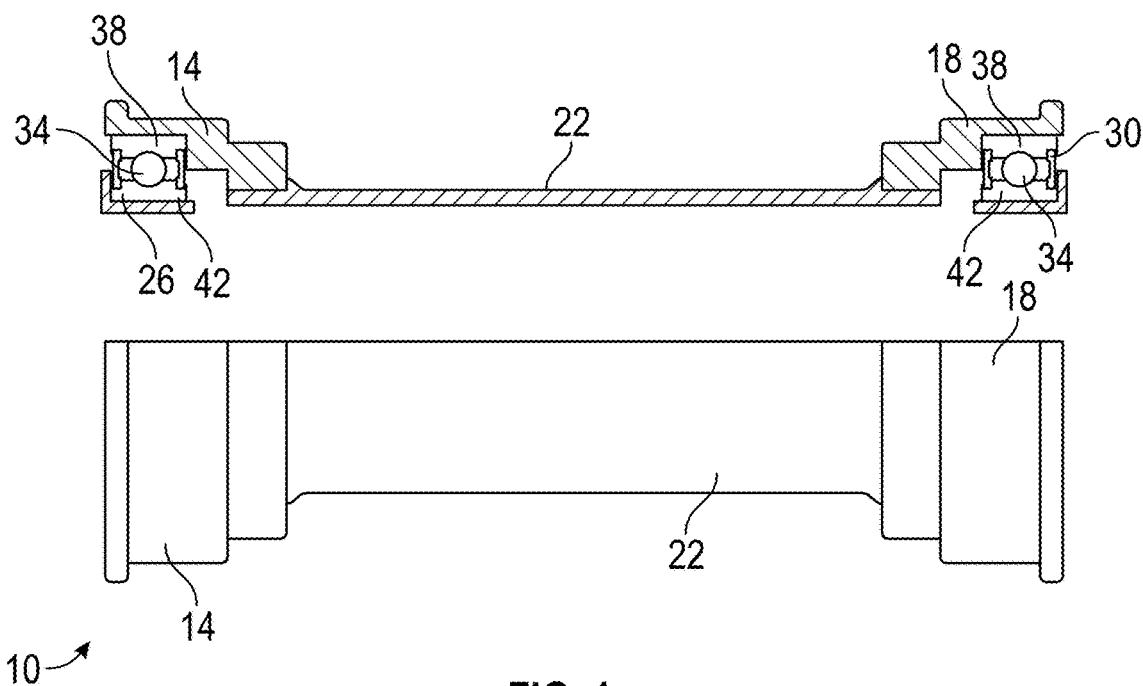
FIG. 1 is a partial cross-sectional side view of a prior art example of a press-fit bottom bracket bearing system.
Figure 2:
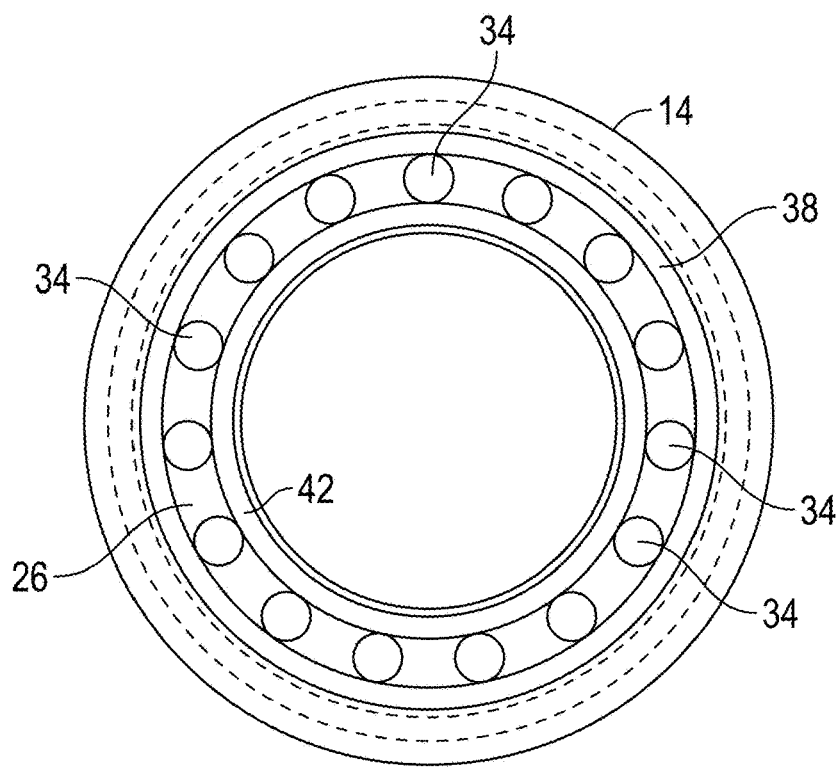
FIG. 2 is a cross-sectional front view of the bottom bracket bearing system from FIG. 1.
Figure 3:
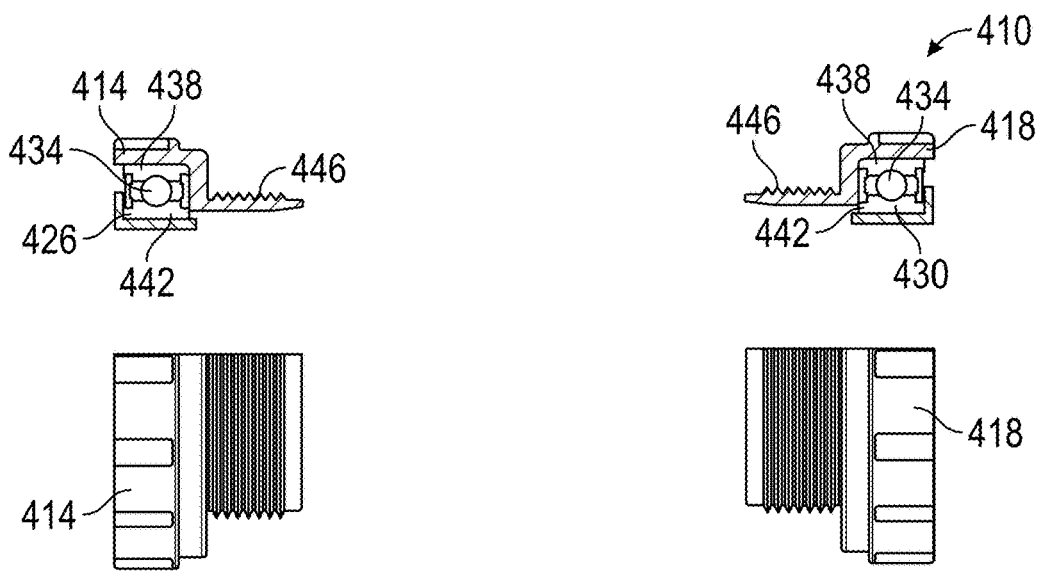
FIG. 3 is a partial cross-sectional side view of a prior art example of a press-fit bottom bracket bearing system.
Figure 4:
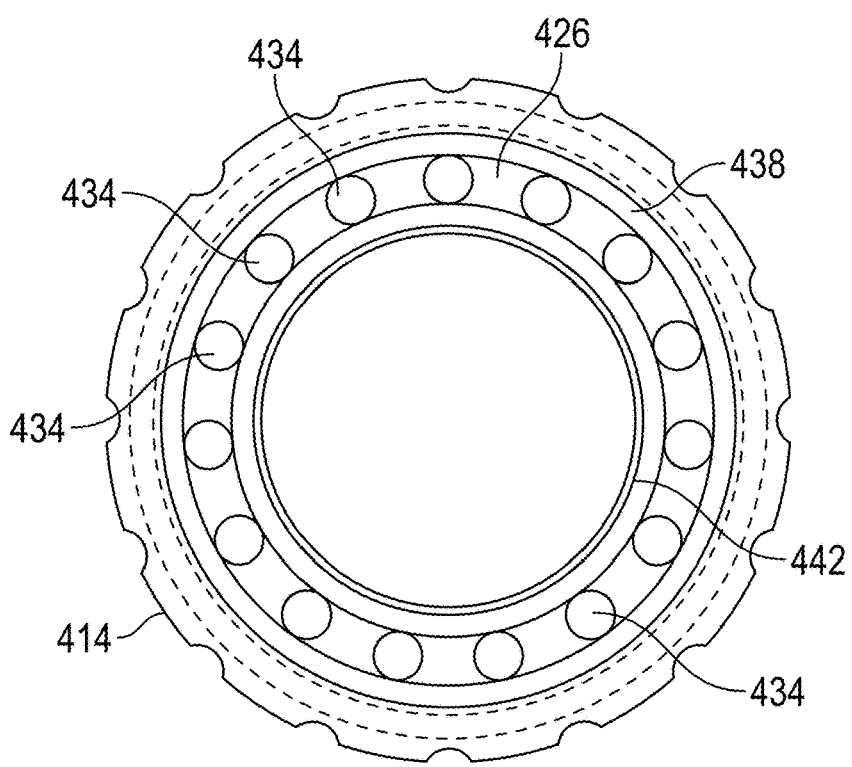
FIG. 4 is a cross-sectional front view of the bottom bracket bearing system from FIG. 3.
Figure 5:
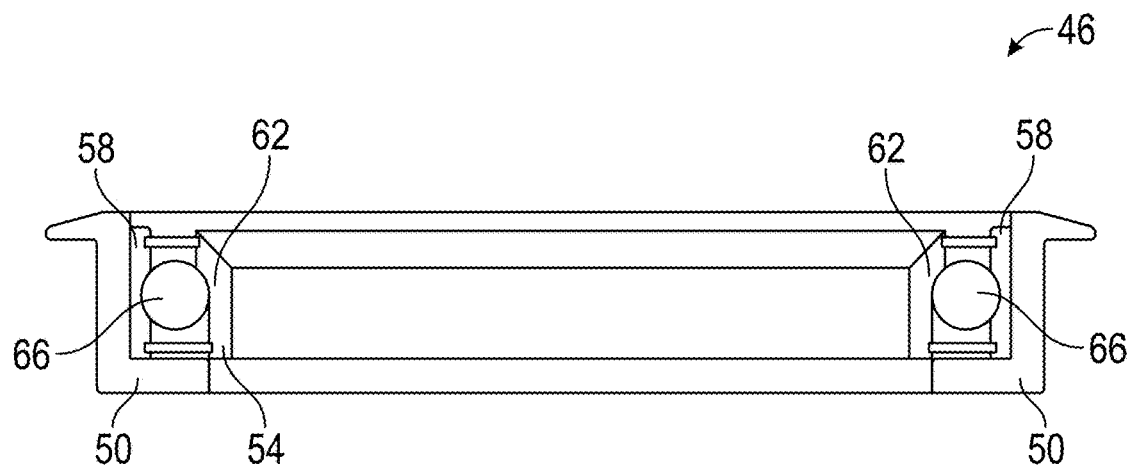
FIG. 5 is a cross-sectional side view of a prior art example of a flanged cup headset bearing system.
Figure 6:
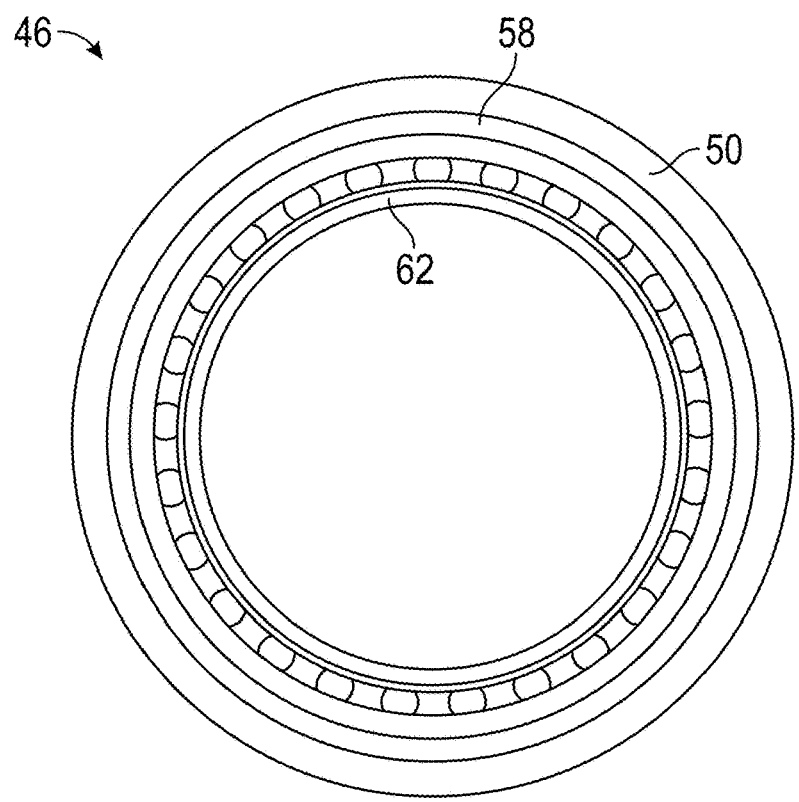
FIG. 6 is a top view of the bearing system from FIG. 5.
Figure 7:
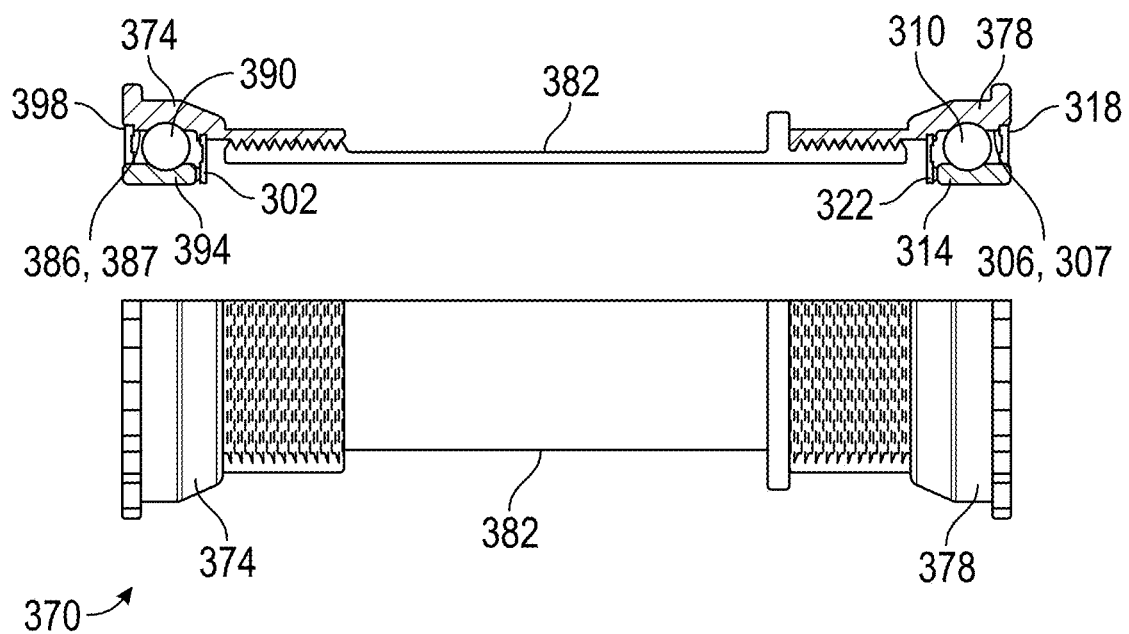
FIG. 7 shows partial cross-sectional side view of a press-fit embodiment of the disclosed bottom bracket bearing system.

FIG. 7 shows partial cross-sectional side view of an embodiment of the disclosed bottom bracket bearing system 370. This embodiment is a press-fit embodiment. However, one of ordinary skill in the art will recognize that this disclosed bearing system can be modified into a thread-in embodiment. The bearing system 370 comprises a first integrated cup 374, a second integrated cup, 378, and a spacer 382. The term "integrated cup" is used in this document to make clear that the bearing system does not have a separate outer race, but rather the internal surface of the "integrated cup" is the outer race. Because the integrated cup 374 does not have a separate outer race, but rather the outer race function is performed by the inner surface of the integrated cup, there is more room between the inner surface of the integrated cup and the inner race for larger rolling elements, even though the bearing system is generally limited in size by the bottom bracket shell. In thread-in embodiments, the size may be limited by the bearing tool or wrench. Thus with larger rolling elements the bearing system 370 can withstand greater loads. A portion of the inner surface 386 of the first integrated cup 374 is the outer race 387 of the rolling elements 390. An inner race 394 is in communication with the inner surface 386 of the first cup via rolling elements 390. Located adjacent the rolling elements are a first seal 398 and a second seal 302. A portion of the inner surface 306 of the second cup 378 is the outer race 307 of the rolling elements 310. An inner race 314 is in communication with the inner surface 306 of the second cup via rolling elements 390. Located near the rolling elements 390 in the second integrated cup 378 are a first seal 318 and a second seal 322. The races 387, 394, 307, 314 are shaped to accept the rolling elements 390, 310. Such shapes may include grooves or channels in the races 387, 394, 307, 314.

Figure 8:
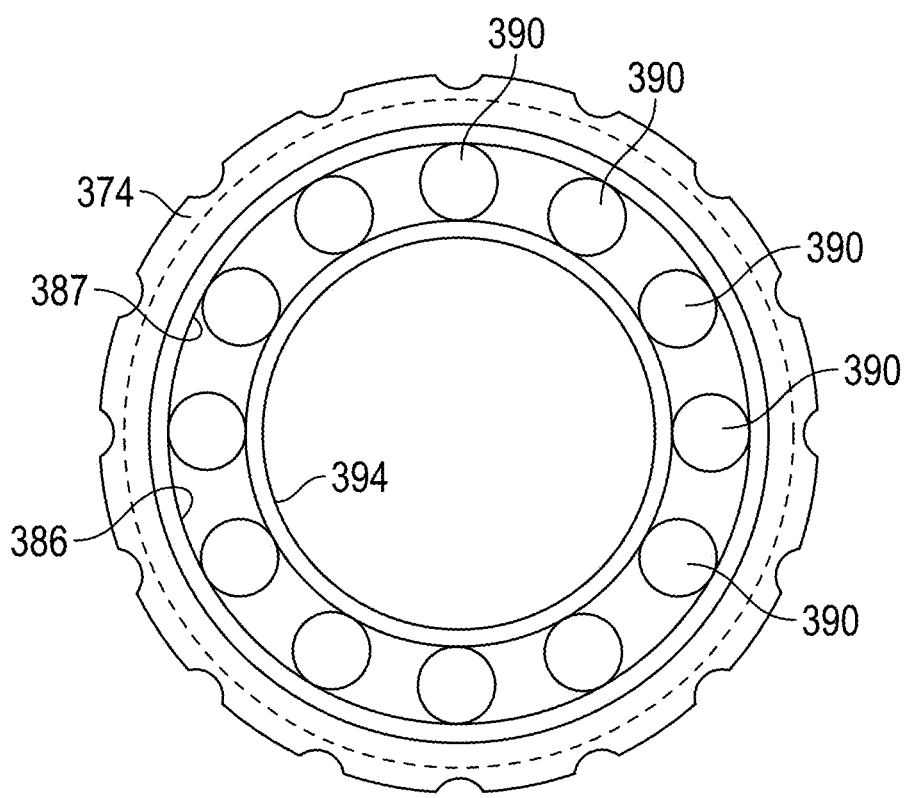
FIG. 8 is a cross-sectional front view of the first cup through the rolling elements of the bottom bracket bearing system from FIG. 7.

FIG. 8 is a cross-sectional front view of the first cup 374 through the rolling elements 390.

Figure 9:
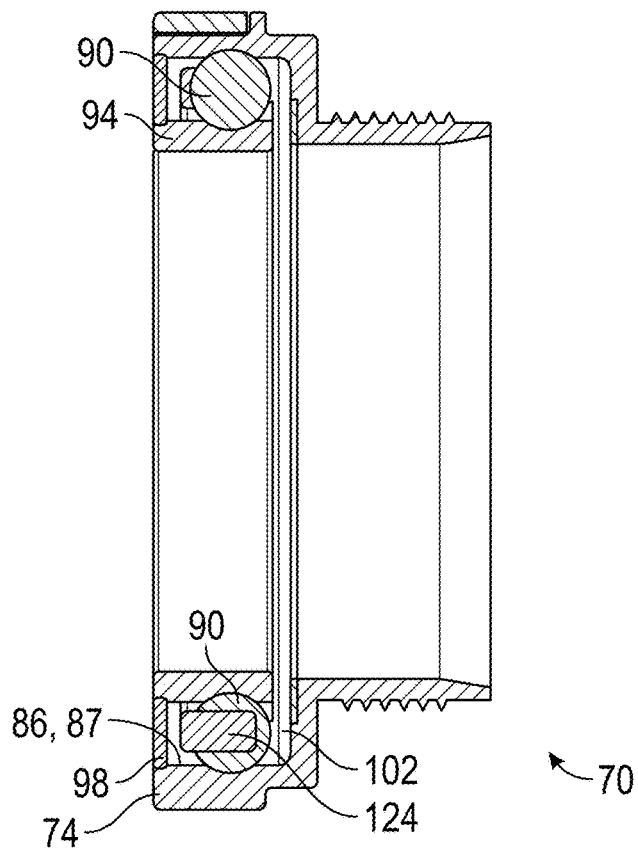
FIG. 9 is cross-sectional view of a thread-in embodiment of the disclosed bottom bracket bearing system.

FIG. 9 is cross-sectional view of a thread-in bottom bracket bearing system 70. The bearing system 70 comprises an integrated cup 74. A portion of the inner surface 86 of the integrated cup 74 comprises an outer race 87 for several rolling elements 90. An inner race 94 is in communication with the inner surface 86 of the first cup via the rolling elements 90. Also shown are a first seal 98 and a second seal 102. Also visible is a bearing retainer 124.

Figure 10:
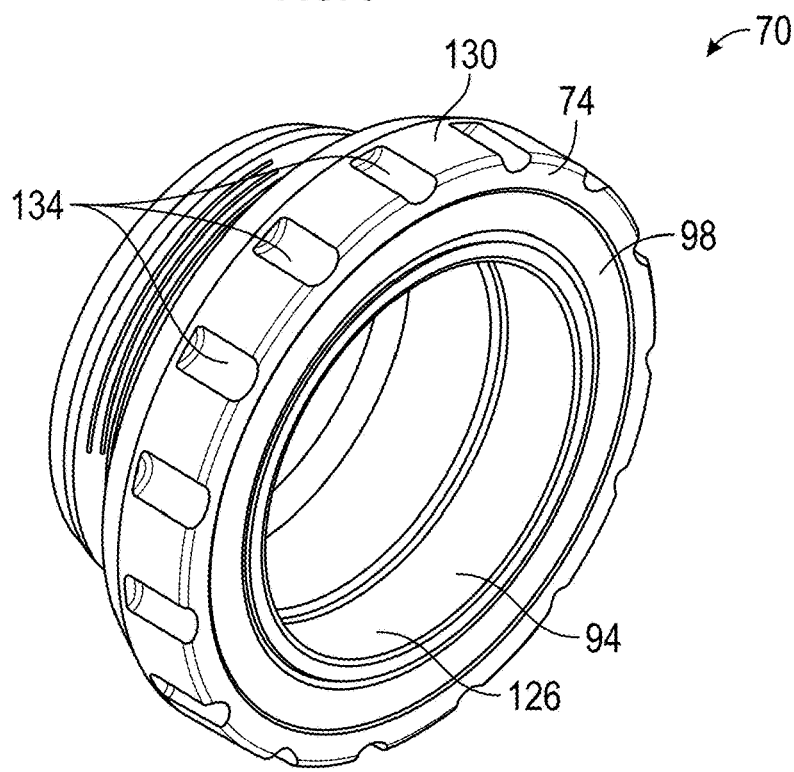
FIG. 10 is a perspective view of the bearing system from FIG. 9.

FIG. 10 is a perspective view of the bearing system 70 from FIG. 9. In this view, the outer surface 126 of the inner race 94 (facing away from the rolling elements 90) is visible. The outer surface 130 may comprises a plurality of splines 134. The splines 134 may be configured to mate with a bottom bracket wrench.

Figure 11:
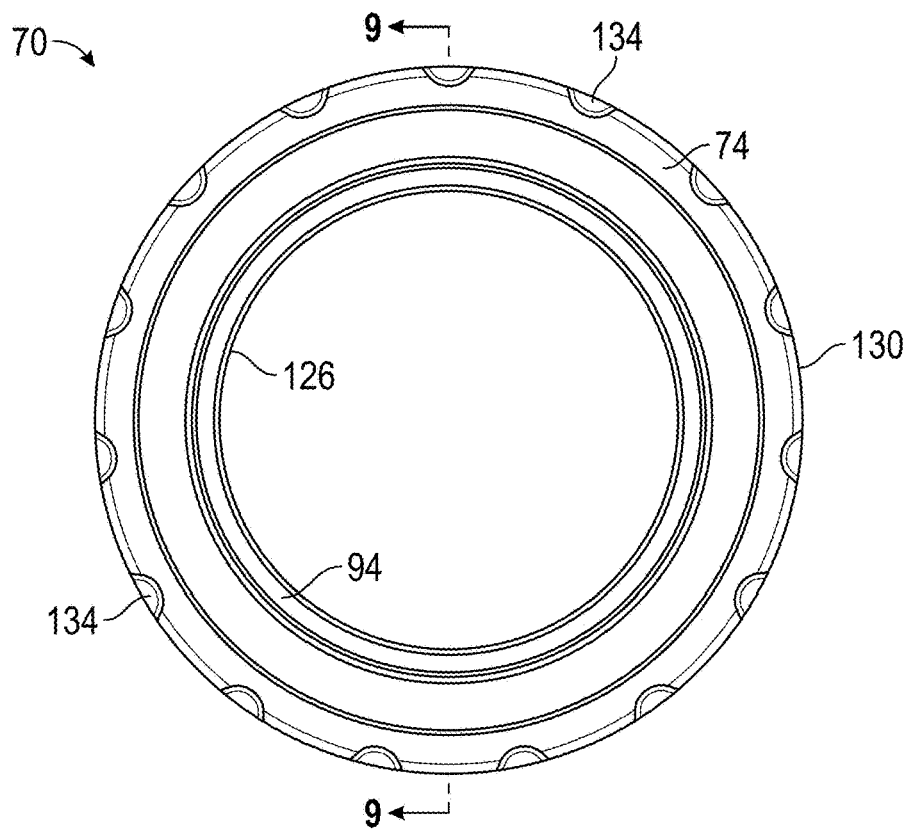
FIG. 11 is front view of the bearing system from FIG. 9.

FIG. 11 is front view of the bearing system 70 from FIG. 9.

Figure 12:
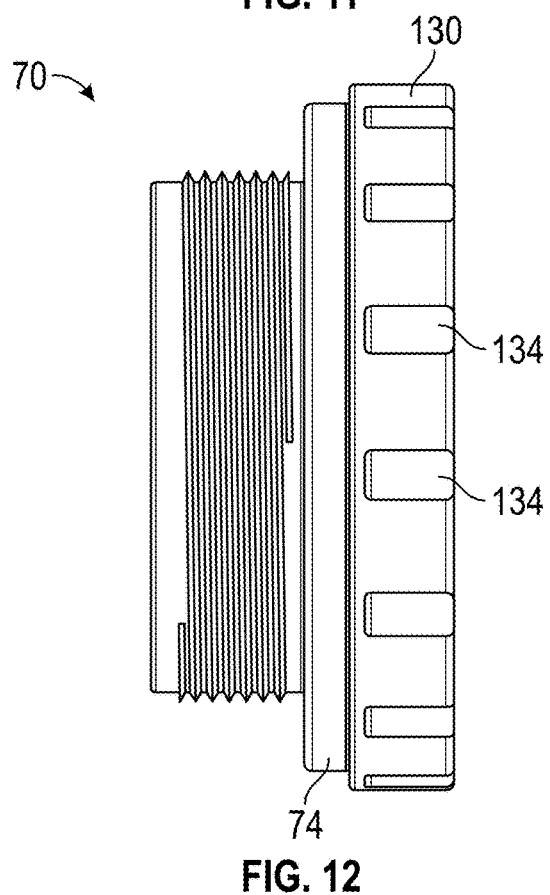
FIG. 12 is a side view of the bearing system cup from FIG. 9.

FIG. 12 is a side view of the bearing system 70 from FIG. 9.

FIG. 12 is a rear view of the bearing system 70 from FIG. 9.

FIG. 14 shows a partial cross-sectional view of another embodiment of the bearing system 70.

Figure 15:
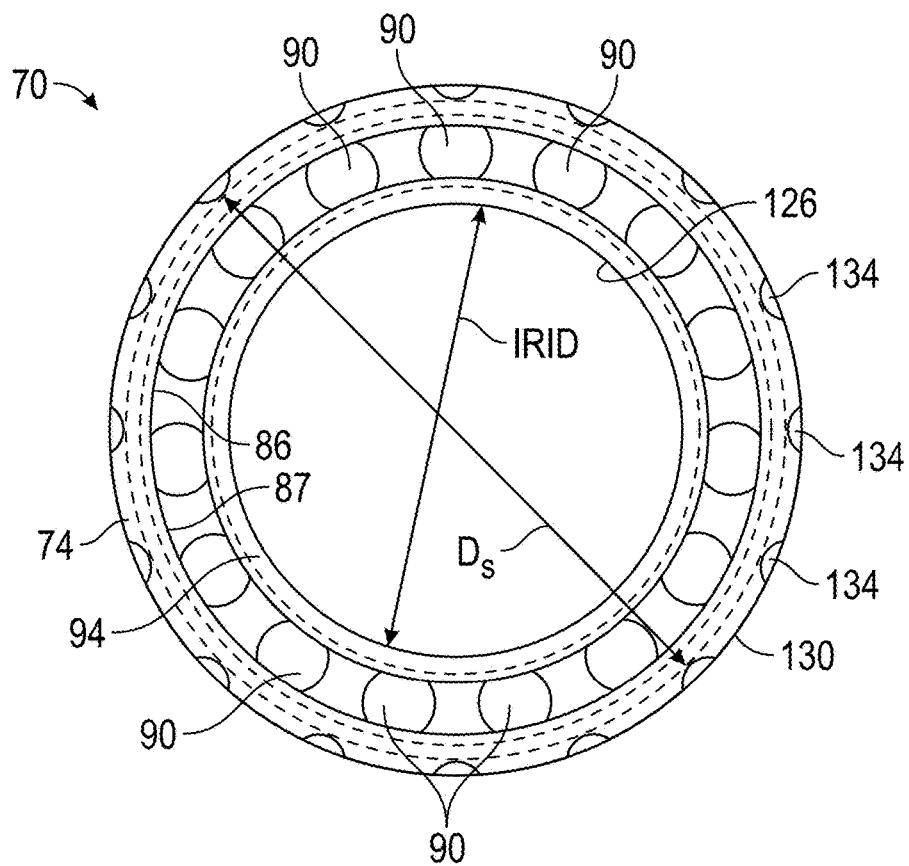
FIG. 15 is a front cross-sectional view of the bearing system from FIG. 14.

FIG. 15 is a front cross-sectional view of the bearing system 70 from FIG. 14. In one embodiment, the spline diameter $D_S$ between the bottom of a first spline 134 on one side of the integrated cup to the bottom of a second spline 134 directly opposite of the first spline on the same integrated cup 74 may be a standard dimension used in the bicycle industry. In one embodiment, the spline diameter $D_S$ may be about 44 mm or 46 mm. Thus it should be noted that the inner surface 86 of the integrated cup 74, the rolling elements 90, inner race 94, seals 98, 102, and bearing retainer 124, shown in FIG. 14, must all fit within the spline diameter. Because the integrated cup 74 does not have a separate outer race, but rather the outer race is integral to the integrated cup 74, there is more room between the outer race 87 and the inner race 94 for larger rolling elements 90, even though the bearing system 70 is generally limited in size by the spline diameter $D_S$. Thus with larger rolling elements 90, 110, the bearing system 70 can withstand greater loads. The inner race 94 has an inner diameter IRID. $D_S$ may also be called a non-flanged outer diameter. A first maximum diameter may be the operational diameter of a bottom bracket bearing tool or wrench. In one embodiment, the first maximum diameter may be about 44 mm or about 46 mm for a bottom bracket bearing. A first minimum diameter for a bottom bracket bearing may be the crank spindle diameter.

Figure 16:
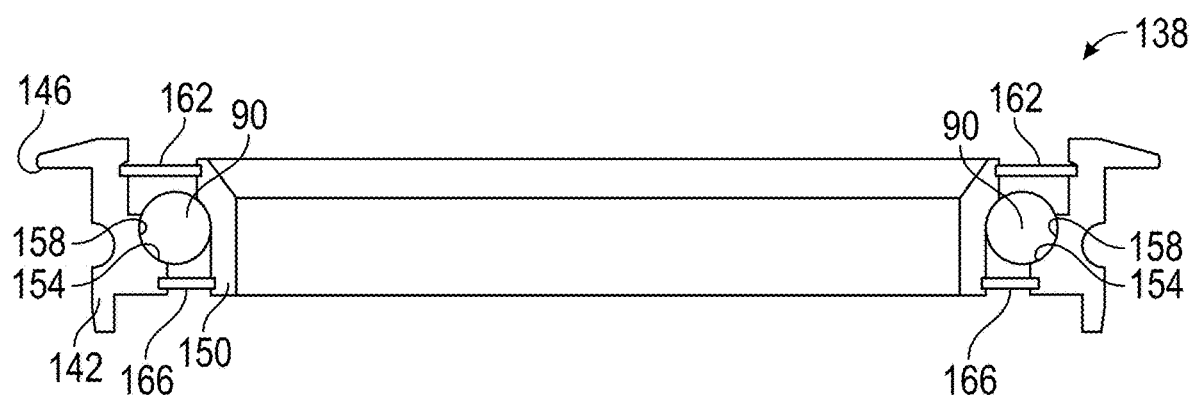
FIG. 16 is a side cross-sectional view of one embodiment of the headset bearing system.

FIG. 16 is a side cross-sectional view of one embodiment of the headset bearing system 138. This bearing system 138 comprises a first integrated cup 142. The integrated cup may have a flange 146. The bearing system 138 also comprises an inner race 150. A plurality of rolling elements 90 abuts the inner race 150 and an inner surface 154 of the first integrated cup 142. A portion of the inner surface 154 is configured to act as an outer race 158 of the bearing system 138. Thus, the integrated cup 142 has an integral outer race 158. Also shown are a first seal 162 and a second seal 166.

Figure 17:
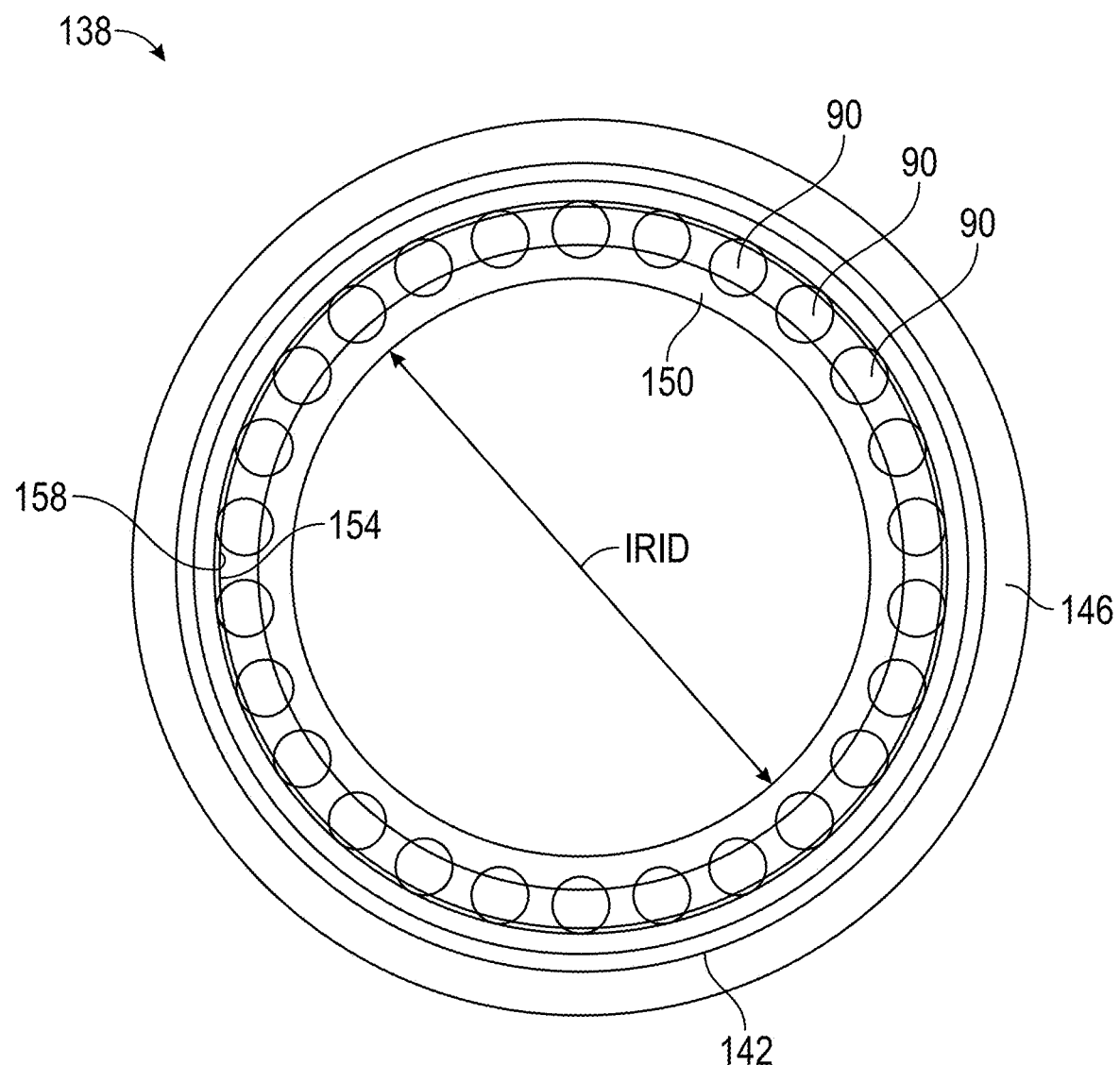
FIG. 17 is a front cross-sectional view of the bearing system from FIG. 16.

FIG. 17 is a front cross-sectional view of the bearing system 138 from FIG. 16. The inner race 150 has an inner diameter IRID.

Figure 18:
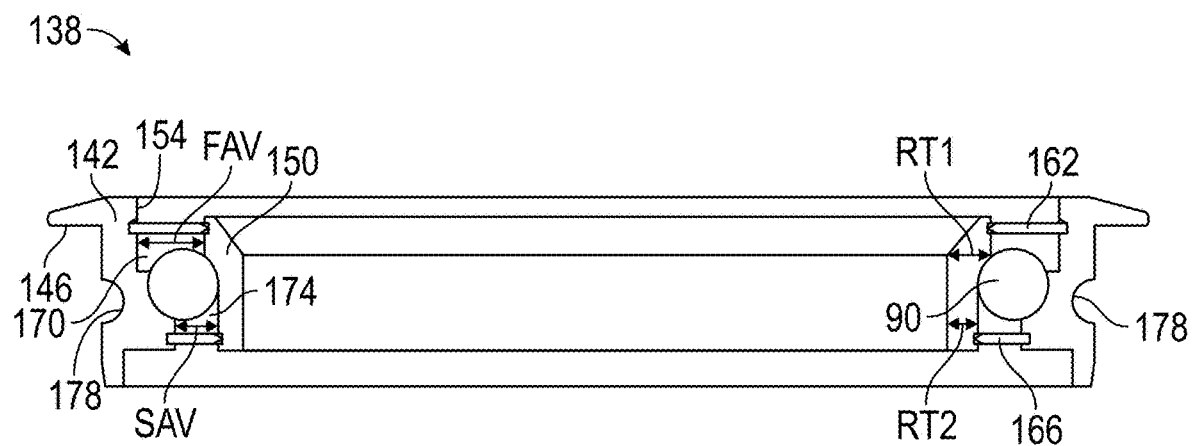
FIG. 18 is a close-up view of the side cross-sectional view from FIG. 16.

FIG. 18 is a close-up view of the side cross-sectional view from FIG. 16. There is a first annular void 170 located between the inner surface of the first integrated cup 142 and inner race 150. The first annular void 170 has a radial length of FAV. There is also a second annular void 174 located between the inner surface of the first integrated cup 142 and the inner race 150. The second annular void 174 has a radial length of SAV. In this embodiment, FAV is larger than SAV. Further, the inner race 150 has a radial thickness RT1 near the first seal 162 and a radial thickness RT2 near the second seal 166. RT1 is larger than RT2, such that the inner race tapers down in thickness as one goes from the first seal 162 to the second seal 166. The outer surface of the integrated cup 142 may have a glue groove 178 cut, or otherwise manufactured into it. The groove 178 helps reduce the weight of the integrated cup 142, and may act as a place for glue or epoxy to hold the integrated cup 142 in a head tube of a bicycle.

Figure 19:
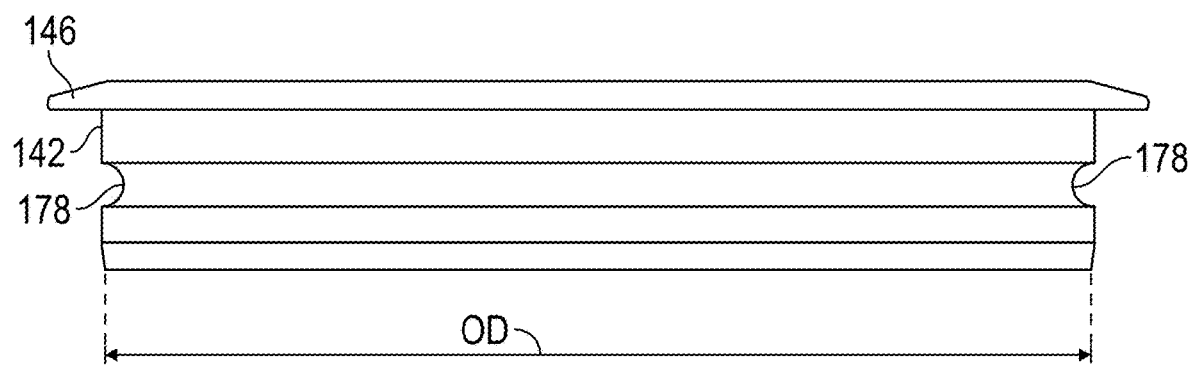
FIG. 19 is a side view of the bearing system from FIG. 14.

FIG. 19 is a side view of the bearing system 138 from FIG. 16. The outer diameter of the integrated cup (not including the flange 146 which acts as a stop to prevent the integrated cup 142 from sliding all the way into a head tube) OD is shown. The OD must be small enough for the integrated cup 142 to slide or press into the bicycle head tube until the flange 146 stops the integrated cup 142 from sliding further into the bicycle head tube. Thus the bicycle head tube inner diameter acts as a limit to the size of the OD of the bearing system 138. Because the outer race 158 is integral to the integrated cup 142, that is, there is no need to manufacture a separate cup and a separate outer race; there is more room for larger rolling elements 90 that can still fit within the OD. With larger rolling elements 90, the bearing system 138 can withstand greater loads. In one embodiment, the OD may be about 44 mm for the top bearing for a head tube, and the OD may be about 56 mm for the bottom bearing for a head tube. OD may also be called a non-flanged outer diameter. For the headset bearing system, a first maximum diameter may be the inner diameter of the head tube. For the headset bearing system, a first minimum diameter may be the steer tube outer diameter.

FIG. 20 shows a side view of a bicycle frame 182 with a bottom bracket bearing system 70 installed in a bottom bracket 186. In addition, there is an exploded assembly view of the top headset bearing system 138 and bottom headset bearing system 139 shown with respect to the head tube 190. Also shown in this view is bearing top cap 194, split ring collar 198, and a crown race 202. In addition, is shown the fork 206 and steerer tube 210.

FIG. 21 is a front cross-sectional assembly view of the bottom bracket 186 showing a first side view of the first bottom bracket bearing system 70 with a second bottom bracket bearing system 71 in a partial cross-sectional view.

FIG. 22 is a close-up view of the bottom bracket 186 with the first bottom bracket bearing system 70 installed.

FIG. 23 is a front cross-sectional view of the bottom bracket 186 showing a first side view of the first bottom bracket bearing system 70 with a second bottom bracket bearing system 71 in a partial cross-sectional view, both bearing systems 70, 71 installed in the bottom bracket 186.

Figure 24:
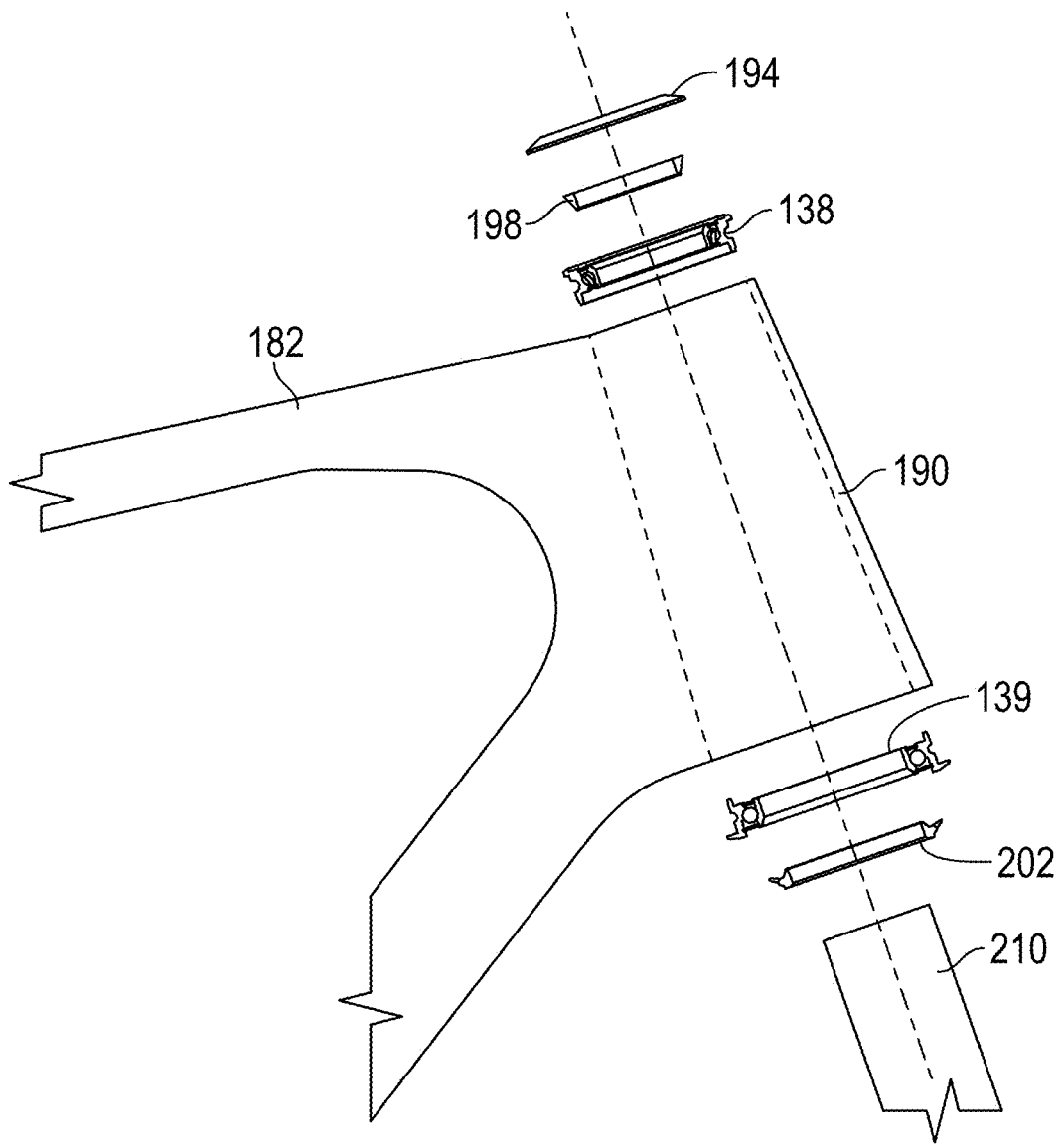
FIG. 24 is a side close up view of the head tube with an exploded assembly view of the top headset bearing system and bottom headset bearing system with complementary headset components.

FIG. 24 is a side close up view of the head tube 190 with an exploded assembly view of the top headset bearing system 138 and bottom headset bearing system 139 shown with respect to the head tube 190. Also shown in this view is bearing top cap 194, split ring collar 198, and a crown race 202. In addition, is shown the steerer tube 210.

Figure 25:
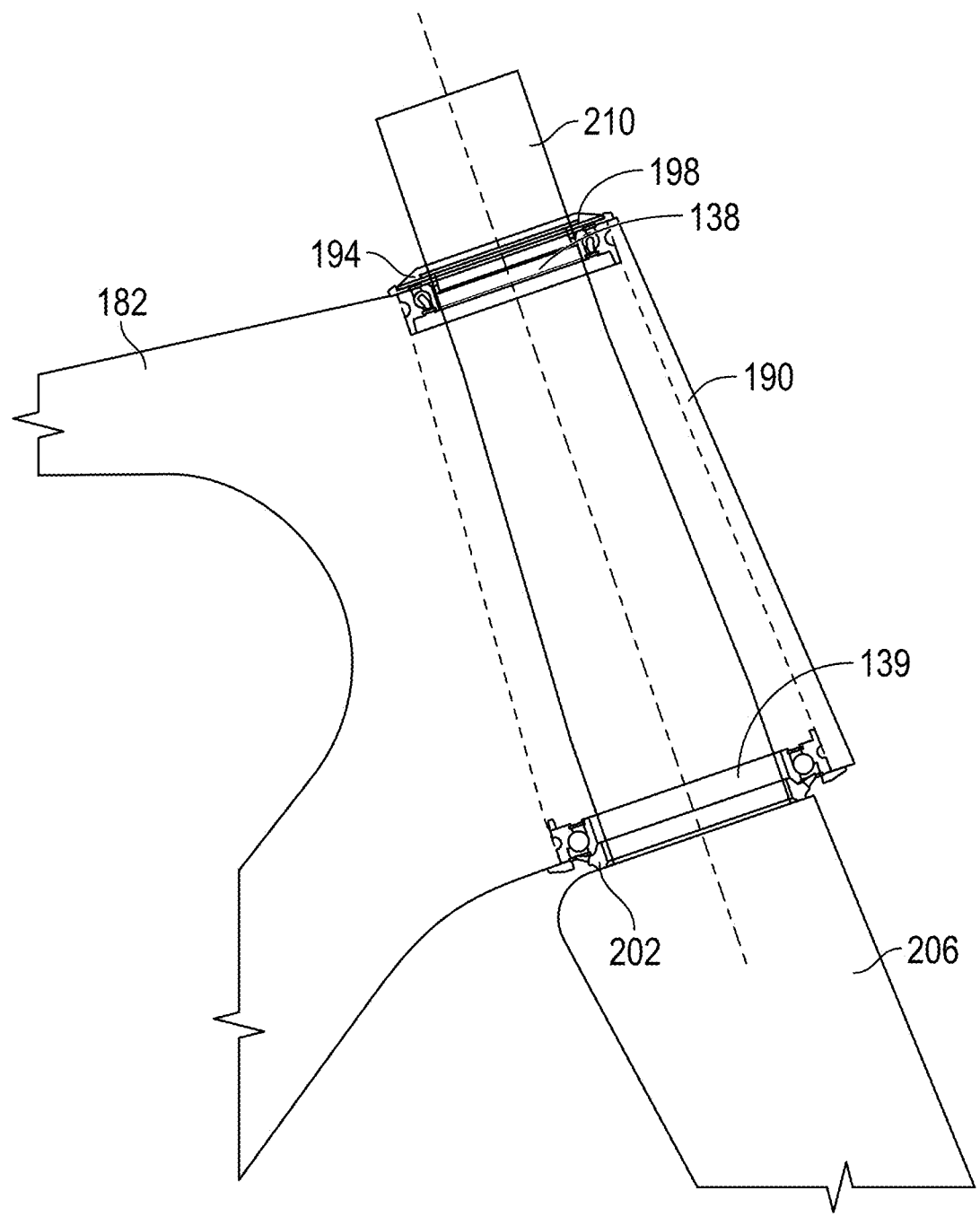
FIG. 25 shows the top headset bearing system and bottom headset bearing system installed on the head tube.

FIG. 25 shows the top headset bearing system 138 and bottom headset bearing system 139 installed on the head tube 190. In this view, the races of the bearing systems 138 and 139 are shown within the inner diameter of the head tube 190.

The disclosed bicycle bearing system has many advantages. The disclosed bearing system may have an outer cup assembly including the threaded section, machined notches for the tool is combined with the outer bearing raceway for the cartridge ball bearing assembly. The disclosed bearing system may use a flanged bearing outer cup that can serve the dual purpose as the outer bearing race in an integrated design. The disclosed bearing system may have an outer cup assembly including the threaded section, an inner cup assembly with internal threaded section, machined notches for the tool is combined with the outer bearing raceway for the cartridge ball bearing assembly. In one embodiment, the bearing system may utilize an internal cup with flanges and with tool notches. Since the flanged outer cup is now also the outer bearing race, it can accommodate a larger ball bearing inside which almost doubles the load capacity. If the rolling elements are ball bearings, the bottom bracket bearings may have a diameter of about 5 mm or greater, or 3/16 inch or greater. The headset bearings may have a diameter of about 4 mm or greater, or 5/32 inch or greater. This increased bearing size despite the limited room not only improves bearing life but allows for greater misalignment of frames which is a common problem especially with carbon fiber frames. In addition, the disclosed bearings may also help overcome frame misalignment issues, which is a common problem. Since the new flanged bearing unit is a single unit, there is little chance of the bearing slipping from the internal cup and failure due to the bearing coming apart.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A bicycle bearing system comprising:
   an integrated cup, the integrated cup having a non-flanged outer diameter;
   a plurality of rolling elements configured to abut and rotate against a first race groove located on an inner surface of the integrated cup;
   a second race groove configured to abut and rotate about the plurality of rolling elements, the second race groove located on an inner surface of the inner race, the inner race having an inner diameter;
   wherein the rolling elements do not have a separate outer race, but rather the inner surface of the integrated cup acts as the outer race to the rolling elements; and
   wherein the rolling elements are separated by a retainer; and
   wherein the rolling elements, retainer, integrated cup and inner race are axially locked when assemble as a single cartridge unit due to the geometry of the rolling elements, retainer, first race groove and second race groove.

2. The bicycle bearing system of claim 1, wherein the integrated cup is configured to fit within bottom bracket shell and the bearing system is configured to allow a crank spindle to fit and rotate within the inner race.

3. The bicycle bearing system of claim 1, wherein the integrated cup is configured to fit within a head tube, and the bearing system is configured to allow a steerer tube to fit and rotate within the inner race; and wherein the rolling elements and inner race are configured to operate within the head tube.

4. The bicycle bearing system of claim 3, further comprising:
   a cup flange located on a first side of the integrated cup;
   a first seal located between the inner race and the inner surface of the integrated cup and on a side of the integrated cup near the cup flange;
   a second seal located between the inner race and the inner surface of the integrated cup and on a side of the integrated cup opposite the cup flange;
   a first annular void bounded by the first seal and a rolling element, the first annular void having a radial length of FAV;
   a second annular void bounded by the second seal and a rolling element, the second annular void having a radial length of SAV;
   wherein FAV is greater than SAV.

5. The bicycle bearing system of claim 4, wherein FAV is at least 50% larger than SAV.

6. The bicycle bearing system of claim 4, wherein the inner race has a radial thickness of RT1 near the first seal, and the inner race has a radial thickness of RT2 near the second seal, and wherein RT1 is larger than RT2.

7. The bicycle bearing system of claim 6, wherein the inner race tapers in radial thickness from a radial thickness of RT1 to a radial thickness RT2.

8. The bicycle bearing system of claim 1, wherein the rolling elements are ball bearings, and the ball bearings have a diameter equal to or greater than about 5 mm.

9. The bicycle bearing system of claim 1, wherein the rolling elements are ball bearings, and the ball bearings have a diameter equal to or greater than about 3/16 inch.

10. The bicycle bearing system of claim 1, wherein the rolling elements are ball bearings, and the ball bearings have a diameter equal to or greater than about 4 mm.

11. The bicycle bearing system of claim 1, wherein the rolling elements are ball bearings, and the ball bearings have a diameter equal to or greater than about 5/32 inch.

12. The bicycle bearing system of claim 1,
    wherein the rolling elements' sizes are maximized to the limitation that the non-flanged outer diameter is smaller or equal to a first maximum diameter, and wherein the rolling elements sizes are maximized to the limitation that the inner diameter is greater or equal to a first minimum diameter; and
    wherein the first maximum diameter is configured to be about equal to an operational diameter of a bottom bracket bearing tool or wrench, and the first minimum diameter is configured to be about equal to a crank spindle diameter.

13. The bicycle bearing system of claim 1,
    wherein the rolling elements' sizes are maximized to the limitation that the non-flanged outer diameter is smaller or equal to a first maximum diameter, and wherein the rolling elements sizes are maximized to the limitation that the inner diameter is greater or equal to a first minimum diameter; and
    wherein the first maximum diameter is configured to be about equal to an inner diameter of a headtube, and the first minimum diameter is configured to be about equal to a steerer tube outer diameter.

* * * * *